June 4, 1968 H. P. LEADER 3,386,234
GRASS AND LITTER CATCHER
Filed Sept. 23, 1965 2 Sheets-Sheet 2
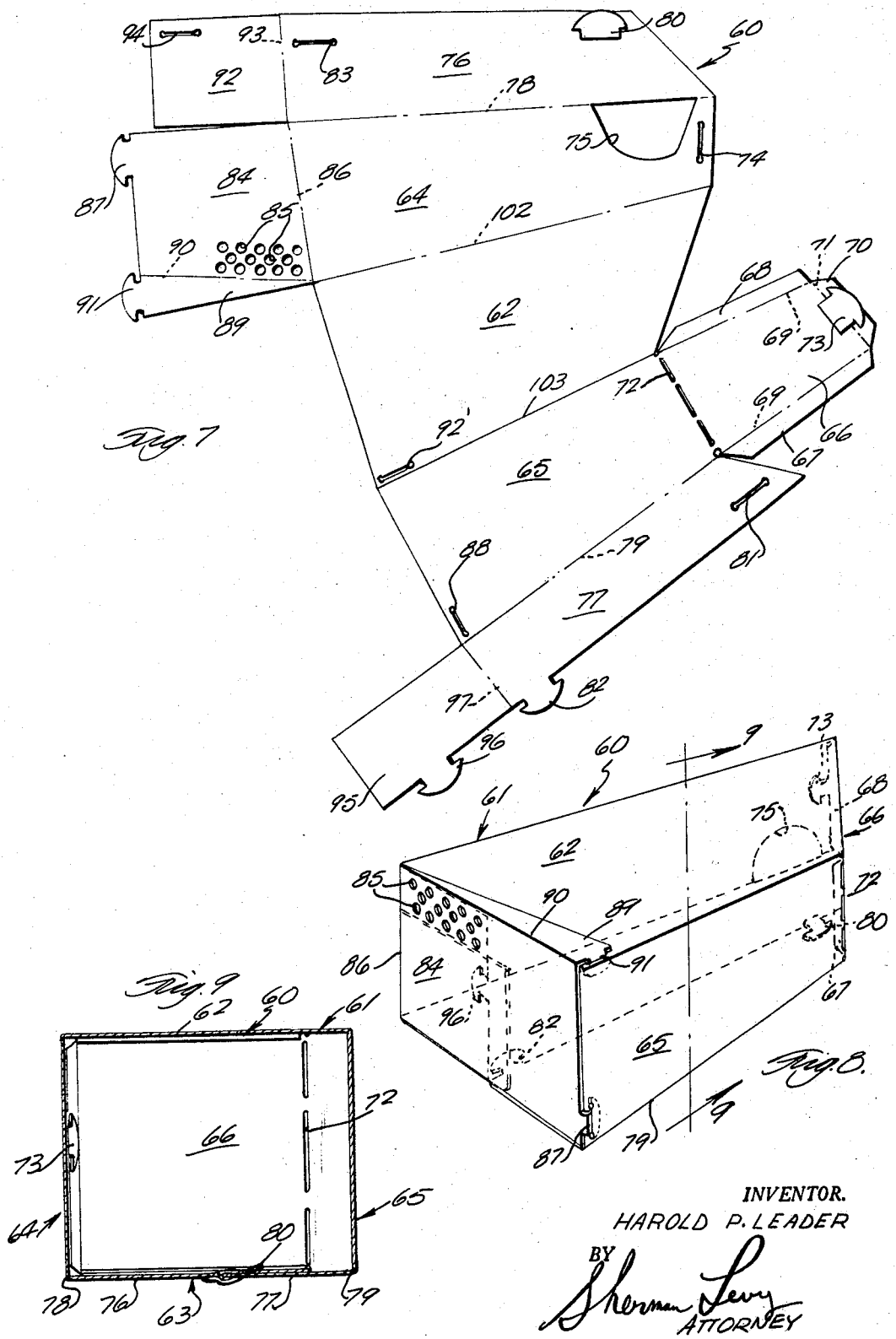
INVENTOR.
HAROLD P. LEADER
BY Sherman Levy
ATTORNEY United States Patent Office 3,386,234
Patented June 4, 1968

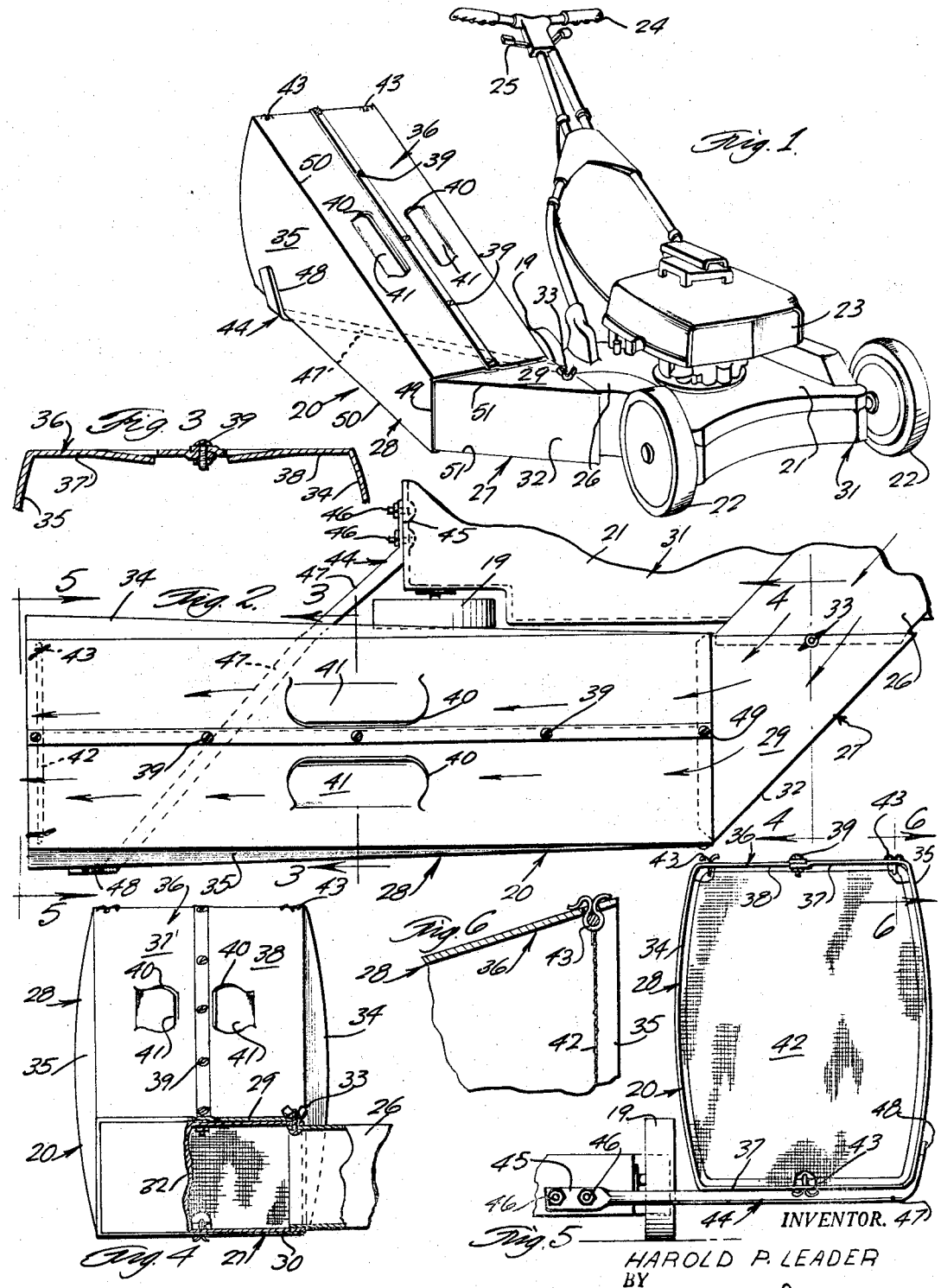

3,386,234
GRASS AND LITTER CATCHER
Harold P. Leader, 2216 Tal Brook Road,
Birmingham, Ala. 35216
Filed Sept. 23, 1965, Ser. No. 489,578
3 Claims. (Cl. 56—202)

This invention relates to a grass and litter catcher, and more particularly to a grass and litter catcher for a lawn mower, such as a rotary type lawn mower.

An object of the invention is to provide a grass catcher which possesses improved functional utility, as for example as compared to the usual bags that have heretobeen used for such purposes, and wherein the present invention is arranged and constructed so that it will load up with grass, leaves and the like completely, and wherein the device is easily and readily empted, and wherein the present invention is easy to attach and detach.

Another object of the invention is to provide a grass catcher than can be installed easily and economically, and wherein the device uses only a minimum amount of space without falling in the way of the rear wheels due to its inherent stiffness, and wherein the grass catcher minimizes expense in that the material does not easily rot or deteriorate as in the case of paper, textile and aluminum grass catchers, and wherein the problems due to clogging because of the relatively small size of individual air vents will be solved.

Still a further object of the invention is to provide a grass catcher and litter cleaner which has a monocoque construction, and wherein an important aspect or feature of the invention is the fact that there is utilized a construction that is made with flat materials of sufficient inherent strength to provide the monocoque construction.

A still further object of the invention is to provide a monocoque construction, and wherein in one form of the invention a means is provided for disposing of the air, by lowering its air speed between inlet and outlet vent, thereby dropping the grass and consisting of one piece construction, and wherein this construction is of one-piece configuration so that the adaptability of the knock-down construction to grass catchers is accomplished.

Still another object is to provide a grass catcher that can be shipped or stored in knock-down condition so as to facilitate and minimize expense in connection with packing, storing and shipping, and wherein flat corrugated boxes or the like can be used.

Another object is to provide a grass catcher that will have a long life so that, for example, it will last as long as the lawn mower.

A further object is to provide a device that is easily and economically produced inasmuch as it can be produced by on standard machinery now used by the corrugated box industry, and wherein the grass catcher can be made in a highly economical manner as by a punch press production from flat stock materials.

Another object is to provide a grass catcher that is adapted to minimize errors productive of wasted labor and material in the formation of the structural members, and wherein the grass catcher may be utilized speedily and with precision by even inexperienced operators.

Still further objects and advantages will become apparent in the subsequent description to the specification.

In the drawings:

FIG. 1 is a perspective view illustrating the grass catcher of the present invention being used with a conventional lawn mower.

FIG. 2 is an enlarged plan view.

FIG. 3 is an enlarged sectional view taken on the line 3—3 of FIG. 2.

FIG. 4 is a sectional view taken on the line 4—4 of FIG. 2.

FIG. 5 is a sectional view taken on the line 5—5 of FIG. 2.

FIG. 6 is an enlarged sectional view taken on the line 6—6 of FIG. 5.

FIG. 7 is a plan view illustrating a modified or alternative type of grass and litter catcher and illustrating the device in open position prior to folding or assembly thereof.

FIG. 8 is a perspective view illustrating the unit of FIG. 7 in folded or assembled position.

FIG. 9 is a sectional view taken on the line 9—9 of FIG. 8.

Referring in detail to the drawings, FIGS. 1–6, the numeral 20 indicates the grass catcher of the present invention which is adapted to be used in conjunction with a conventional lawn mower, such as the rotary lawn mower 31, FIG. 1. The lawn mower 31 includes the usual deck or frame 21, wheels such as the front wheels 22 and rear wheels 19, and motor or engine 23 as well as handles 24, and controls 25 may also be provided. The numeral 26 indicates the lateral discharge for the lawn mower 31.

As shown in the drawings the grass catcher 20 of the present invention includes an inlet portion 27 as well as a main body portion 28, and these parts are adapted to be made of a suitable material, such as a suitable rigid plastic, which will not rot, mildew or the like.

The inlet portion 27 of the grass catcher includes spaced parallel horizontally disposed top and bottom walls 29 and 30, FIG. 4. The inlet portion 27 includes a vertically disposed inclined front wall section 32 connecting said top and bottom walls, and the inlet portion 27 is arranged so that it overlaps the outer end of the lateral discharge 26, as shown in FIG. 4 for example.

The numeral 33 indicates a suitable fastening means, such as a bolt and nut assembly which is adapted to be used for maintaining the inlet portion 27 connected to the lateral discharge 26. However, when the grass catcher 20 is to be removed from the lawn mower, as for example, in order to empty the grass catcher, the bolt and nut asembly 33 can be readily manually loosened, whereby the entire grass catcher can be disconnected to facilitate emptying of the grass or leaves into a trash receptacle or other location.

As shown in the drawings, the main body portion 28 of the grass catcher, as well as the inlet portion 27, are of hollow formation, and these parts are adapted to be made of a suitable rigid material, such as a suitable plastic substance or material. The main body portion 28 includes spaced parallel generally vertically disposed side walls 34 and 35, as well as a horizontally disposed bottom wall 37, and the main body portion 28 also includes an inclined top wall 36. It will be seen that the grass catcher main body portion 28 has a somewhat tapered formation so that it gradually increases in size toward the outer or rear end thereof due to this arrangement and construction of the parts. The top wall 36 includes overlapping portions 37 and 38 which are adapted to be joined together in any suitable manner as by means of fasteners or securing elements 39. The top wall 36 is provided with recesses or cutouts 40 that define gripping portions 41 that are adapted to be used in the lifting of the grass catcher, as for example when the grass catcher is installed or removed.

There is also provided in the outer end of the main body portion 28 an upstanding screen or reticulated member which is indicated by the numeral 42, and the screen 42 is adapted to be held in place as by retainers or hooks 43.

The numeral 44 indicates a support member or bracket which is adapted to be used for helping to support the grass catcher 20. The support member 44 includes a flattened end portion 45 that is suitably affixed to the lawn mower, as for example by means of securing elements 46. The support member 44 further includes an elongated or generally straight portion 47 that is arranged just below the bottom wall 37 of the grass catcher 20, as shown in FIG. 2 for example, and the support member 44 further includes or has on its outer end an upstanding or transverse portion 48 that is arranged contiguous to the side wall 35 of the grass catcher whereby the grass catcher is snugly and conveniently supported in its proper position.

The main body portion 28 is adapted to be connected to the inlet portion 27 in any suitable manner, as for example by means of fasteners or securing elements 49.

In the drawings the numeral 50 indicates corners or edges that extend longitudinally and serve to connect the side walls 34, 35 to the top and bottom walls 36, 37 of the main body portion 28. Similarly, the numeral 51 indicates elongated edges which extend along the inlet portion 27 and serve to connect top and bottom walls 29, 30 to front wall 32. Due to the position of these elongated seam-like portions or edges 50 and 51, the main body portion and inlet portion can be conveniently folded to a flat position when the device is not being used, permitting the device to be stored or shipped in an economical and flat condition in order to minimize space requirements.

Thus, with the lawn mower being used and operated, the grass, leaves and the like which are discharged out through the outlet 26 will enter the inlet portion 27, and due to the shape or configuration of the inlet portion 27, including the inclined wall 32, this cut grass will travel backwardly or rearwardly and enter the hollow main body portion 28. Due to the provision of the screen 42, the air can pass outwardly through the holes or openings in the screen 42, but the grass will be properly retained within the main body portion 28. The upstanding portion 48 and the hollow portion 47 of the support member 44 are arranged so that the grass catcher will be properly supported or held in the proper manner. The end portion 45 of the support member 44 is adapted to be affixed to the lower member as at 46.

When it is desired to empty the grass catcher 20 it is only necessary to loosen and remove the bolt assembly 33 whereby a person can readily manually grip the handle portions 41 and lift the entire grass catcher 20 up off of the support member 44, and the grass catcher 20 can be carried to a convenient location, such as a trash can or pile of rubbish or the like so that the grass clippings can be readily emptied out of the grass catcher into the desired location. The grass catcher can then be emptied and returned to its proper location and arranged as shown in FIG. 1, and the bolt and nut assembly 33 can be tightened in place so that the lawn mower and grass catcher are ready to be used in the desired manner.

The grass catcher 20 of the present invention is made so that it can be folded into a small unit when it is not being used. Thus, when the grass catcher is not being used the portions 27 and 28 can be separated from each other by loosening the securing elements 49. In addition, the support member 44 can be readily separated from the lawn mower by loosening the bolt assembly 46. Also, the portion 27 can be moved to a flattened formation by folding the walls of the portion 27 about the edges 51. Likewise the main body portion 28 can be arranged in a flattened configuration by removing or loosening the bolts 39 and removing the screen 42 so that the portion 28 can be moved to a flattened position by folding the walls of the portion 28 along the edges 50. The parts can be made of any suitable material and in different shapes or sizes as desired or required.

The previous description is in particular reference to the form of the invention shown in FIGS. 1–6 of the drawings. Attention is now directed to FIGS. 7, 8 and 9 of the drawings wherein the numeral 60 indicates a modified grass and litter catcher or cleaner which has a monocoque construction as does the previously described device 20 of FIGS. 1–6. The device 60 includes a body member 61 that has a hollow formation and is adapted to be made of a suitable material, such as a suitable plastic, which is not subject to corrosion, deterioration and the like, and the member 61 is adapted to be of one-piece unitary construction, as shown in FIGS. 7, 8 and 9, and the body member 61 has spaced apart generally horizontally disposed top and bottom walls 62 and 63 as well as vertically disposed spaced apart first and second side walls 64 and 65. The numeral 66 indicates an end wall that is hingedly connected to the side wall 65 by means of a front or hinge line 72. The end wall 66 is provided with flaps 67 and 68 which are joined thereto by suitable wall or hinge lines 69 and a flap or edge portion 70 is joined to the end wall 66 by means of a fold line 71. The numeral 73 indicates a tongue which is adapted to be suitably affixed to or formed integral with the end wall 66 and the tongue 73 is adapted to engage a suitable slot 74 in the side wall 64. When the parts are properly assembled, in order to maintain the parts in their properly assembled relationship, it is to be understood that instead of using the latching means, a retainer or other type of holding means can be utilized. The first wall 64 has an opening 75 therein which is adapted to function as an inlet vent or opening so that the cut grass and litter from the lawn mower can enter the hollow body member 61 through the opening 75. As shown in FIG. 8, for example, when the parts are assembled an end wall 66 is arranged at an angle with respect to a longitudinal axis of the device. In addition, the assembled device 60 has a generally tapered formation so that it is adapted to increase in size from the inlet end toward the outer end, and this has the important advantage of causing the air to become lowered in speed or velocity so that the grass will have a tendency to drop from the air into the proper part of the grass catcher 60.

The bottom wall 63 of the device is adapted to be made by utilizing overlapping sections or portions 76 and 77, and these portions 76 and 77 are adapted to be integrally joined to the adjacent walls by fold lines 78 and 79, FIG. 7. These sections have latch means or interengaging and interfitting tongue and slots 80 and 81, as well as other interengaging tongue and slot members 82 and 83.

There is further provided an outer end member 84 which is joined to the side wall 64 by means of a fold line 86, and the member 84 is adapted to provide openings 85 therein so that the air can discharge therethrough in the desired manner. The numerals 87 and 88 indicate interengaging tongue and slot means on the end member 84 and second side wall 65.

As shown in the drawings, there is further provided a flap or edge portion 89 which is hingedly connected to member 84 by means of a fold line 90 and the flap 89 is in engagement with a slot 92' in the top wall 62.

The numeral 92 indicates a generally rectangular end portion or flap that is hingedly connected to the section 76 through the medium of a crease line 93 and the flap 92 is provided with a slot 94 for engagement by a tongue of a flap 95 and the flap or portion 95 is hingedly connected to section 77 by means of a fold or crease 97.

It is to be understood that the device of FIGS. 7–9, is adapted to have various accessories in the same manner as the device described in connection with FIGS. 1–6. Thus, the device of FIGS. 7–9 is adapted to have suitable hand gripping portions, and a suitable support member, such as the support member 44, is adapted to be used for supporting the device 60 in position to receive cut grass from discharge 26 of a lawn mower, such as the lawn mower 31. Thus, the lateral discharge is adapted to communication with the opening 75 so that the cut grass will be retained in the device while the air will have to pass out through the exit portion of the unit, such as out through the openings 85.

With further reference to the monocoque construction, it is to be noted that the walls are stiff enough without any additional wires and the like to support the same. Also it is constructed so that it will not deteriorate even when used in adverse conditions, such as acidic conditions.

With further reference to the monocoque construction, it is to be noted that due to this construction and arrangement, the device relies on the strength of the skin or shell to carry either the shear or the load due to bending movements. This monocoque construction functions as a reinforced arrangement to accomplish the desired results.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A grass catcher adapted to be mounted on a lawn mower adjacent the lateral discharge thereof, comprising an elongated hollow structure of rectangular cross section having means adjacent a side of one end to receive air entrained grass clippings from said lateral discharge and means adjacent the other end to exhaust air therefrom, said structure being tapered such that the cross sectional area increases from said receiving means to said exhaust means and being made of a relatively rigid but flexible material in such a manner that the catcher may be collapsed for storge purposes when removed from the mower.

2. A grass catcher as set forth in claim 1 wherein said hollow structure includes a main body portion and an inlet portion connected to one end of said body portion and adapted to be connected to said lateral discharge, said means to exhaust the air being a screen, hand gripping portions on said body portion and a support member adapted to have one end secured to said mower, an intermediate portion supporting the bottom of said main body portion and an outer end portion conforming to the outer side of said body portion.

3. A grass catcher as defined in claim 1 wherein said hollow structure is made of a one piece member folded and secured by integral and interconnected tongue and slot means so as to provide relatively flat top, bottom, side and end walls, said receiving means being an opening adjacent the front of one side wall and said exhaust means being a plurality of apertures in an end wall remote from the above noted opening.

References Cited

UNITED STATES PATENTS

| | | | |
|---|---|---|---|
| 2,494,062 | 1/1950 | Sherrow | 56—202 |
| 2,783,604 | 3/1957 | Cahill | 56—202 |
| 2,983,095 | 5/1961 | Barth | 56—202 |
| 3,002,332 | 10/1961 | Shane | 56—203 |
| 3,132,457 | 5/1964 | Slemmons | 56—202 |

FOREIGN PATENTS

| | | |
|---|---|---|
| 214,915 | 4/1958 | Australia. |

RUSSELL R. KINSEY, *Primary Examiner.*